UNITED STATES PATENT OFFICE.

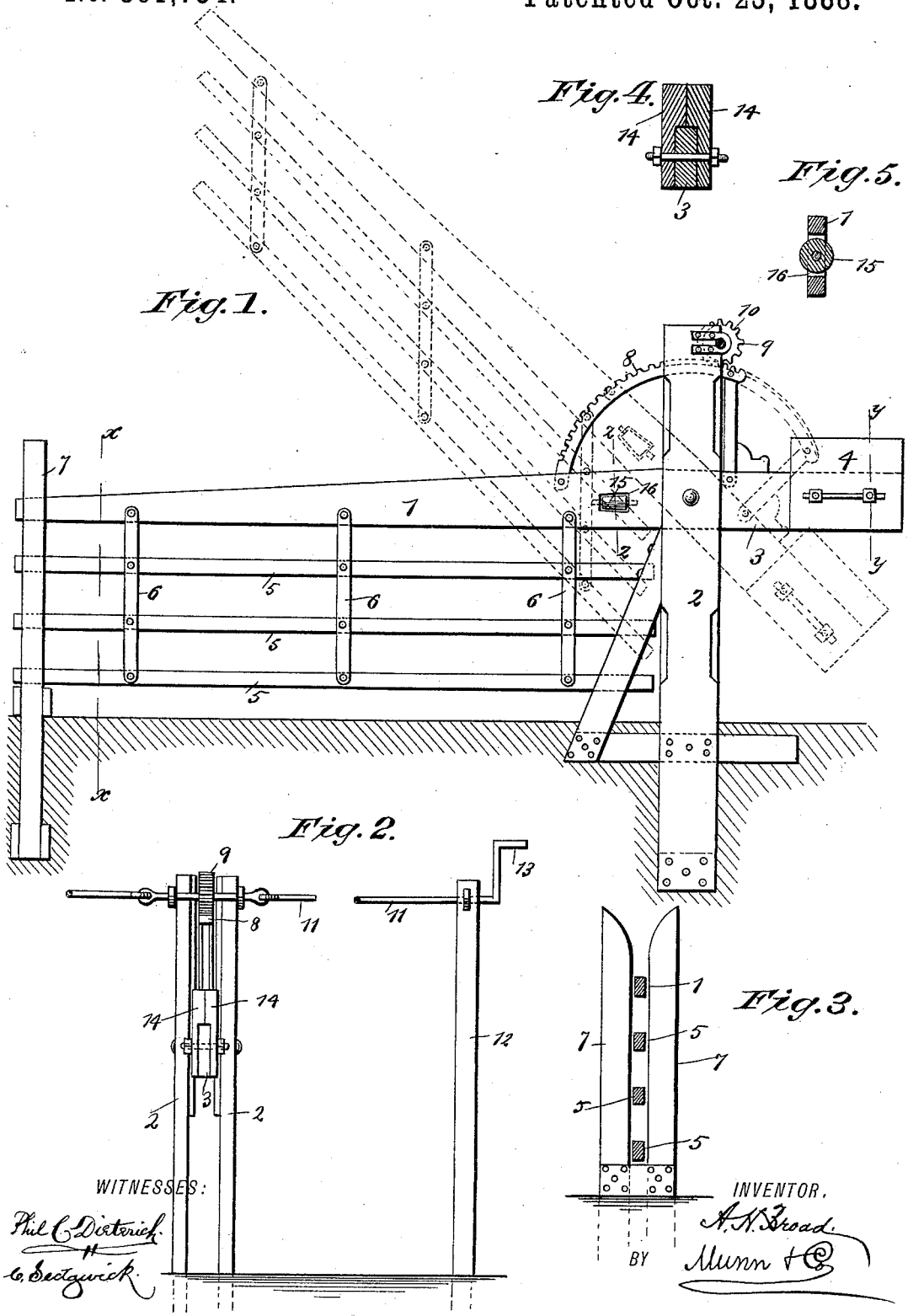

ALPHONSO H. BROAD, OF BERKELEY, CALIFORNIA, ASSIGNOR OF ONE-HALF TO ROLDIN S. ROBBINS, OF SAME PLACE.

GATE.

SPECIFICATION forming part of Letters Patent No. 391,734, dated October 23, 1888.

Application filed May 11, 1888. Serial No. 273,574. (No model.)

*To all whom it may concern:*

Be it known that I, ALPHONSO H. BROAD, of Berkeley, in the county of Alameda and State of California, have invented a new and Improved Gate, of which the following is a full, clear, and exact description.

This invention relates to vertically-swinging gates, and has for its object to provide a gate of this kind so constructed that it will be effective in operation, and may be easily raised and lowered.

The invention will be set forth in the following description, and pointed out in the claim.

Reference is to be had to the accompanying drawings, forming a part of this specification, in which similar figures of reference indicate corresponding parts in all the views.

Figure 1 illustrates a vertically-swinging gate constructed in accordance with this invention. Fig. 2 is an end view thereof in rear of the operating mechanism with connection broken away. Fig. 3 is a vertical section on line *x x*, Fig. 1. Fig. 4 is a detail in vertical section on line *y y*, Fig. 1; and Fig. 5 is a detail in vertical section on line *z z*, Fig. 1.

In the construction of gates of this kind it is necessary that they should be so formed and arranged as to work easily and require little power to operate them. With this in view I have constructed a gate formed with a swinging bar, 1, pivoted in a double post, 2, and having a rear extension, 3, projecting beyond the post 2, and provided with a weight, 4, sufficient to counterbalance the gate and aid in elevating it, and also serving to hold it in raised position. From the bar 1 are suspended horizontal bars 5, by means of hangers 6, pivoted thereto and to the body. The outer ends of the bar 1 and bars 5 are located in a double or vertically-slotted post, 7. To raise and lower the gate, the bar 1 is provided with a toothed segmental bar, 8, located concentrically with the pivotal point of bar 1, and meshing with a toothed wheel, 9, mounted in bearings 10 at the top of the post 2. This wheel 9, as shown, is journaled to operate between the uprights of post 2, and is thereby held firmly in mesh with the segment 8, which also operates between said uprights, by reason of which construction there is no possibility of lateral or other strain forcing the pinion out of mesh with the segment. The toothed wheel 9 is provided with a shaft, 11, which may be of any desired length and extend to any suitable point, where it is mounted on a post, 12, and terminates in a crank-handle, 13. This shaft 11 is formed in sections, united near to the post 2 by a universal joint, as shown most clearly in Fig. 2, the joint being shown as effected by forming the meeting ends of the sections with loops interlocked or linked together. By this construction the shaft may be extended out of a straight line where so desired—as, for instance, on a hillside, or where the road approaching the gate and next thereto is not at a right angle to said gate.

The weight 4 may be of any suitable shape and secured to bar 1, as desired. As here shown, it consists of two parts, 14, bolted to the end of bar 1.

The operation of the gate is readily seen. By turning the crank 13 the bar 1 swings on its pivot through the double post 2, the toothed wheel 9 acting on the toothed segmental bar 8, and aided by the counter-weight 4, causing the bar 1 to be raised. The bar 1 is lowered from its elevated position by reversing the operation, the segmental bar 8 traveling in the opposite direction. The weight of the gate when the latter is down is sufficient to counterbalance the weight 4.

In order that the bar 1 shall not bind in the post 2 by reason of the pressure of the wind against the gate, or from other causes, the bar 1 is provided with a friction-roller, 15, located in a slot, 16, therein, so that its sides bear against the inner sides of the post 2 and permit of the easy movement of bar 1 in the post 2.

It will be seen that by means of this invention a serviceable vertically-swinging gate is provided which will operate easily and effectively.

Having thus described my invention, I claim as new and desire to secure by Letters Patent—

The improved gate herein described, consisting of the post 2, having uprights set slightly apart, the pinion 9, operating between the uprights of post 2 and provided with shaft 11, formed in sections united by universal joint, the gate proper pivoted between the uprights of post 2 and provided with segment 8, meshed by pinion 9, and the roller 15, journaled to the gate and projecting at its opposite sides beyond the opposite sides or faces of the gate, all substantially as and for the purposes specified.

ALPHONSO H. BROAD.

Witnesses:
R. S. ROBBINS,
A. B. MERRILL.